(12) United States Patent
Katoch et al.

(10) Patent No.: US 7,439,759 B2
(45) Date of Patent: Oct. 21, 2008

(54) OPERATING LONG ON-CHIP BUSES

(75) Inventors: Atul Katoch, Eindhoven (NL); Manish Garg, Eindhoven (NL); Evert Seevinck, Nijmegen (NL); Hendricus Joseph Maria Veendrick, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/558,145

(22) PCT Filed: May 17, 2004

(86) PCT No.: PCT/IB2004/050718

§ 371 (c)(1),
(2), (4) Date: Nov. 21, 2005

(87) PCT Pub. No.: WO2004/107190

PCT Pub. Date: Dec. 9, 2004

(65) Prior Publication Data

US 2006/0244481 A1  Nov. 2, 2006

(30) Foreign Application Priority Data

May 27, 2003 (EP) .................................. 03101537

(51) Int. Cl.
H03K 17/16 (2006.01)
H03K 19/003 (2006.01)

(52) U.S. Cl. .............................. 326/26; 326/27; 326/31; 326/32

(58) Field of Classification Search ............. 326/26–27, 326/30
See application file for complete search history.

(56) References Cited

U.S. PATENT DOCUMENTS 5,565,803 A * 10/1996 Fulcomer ...................... 327/99
6,084,433 A * 7/2000 Momtaz ....................... 326/83
6,894,547 B2 * 5/2005 Takahashi .................... 327/170

* cited by examiner

Primary Examiner—Anh Q Tran
(74) Attorney, Agent, or Firm—Peter Zawilski

(57) ABSTRACT

As technology scales, on-chip interconnects are becoming narrower, and the height of such interconnects is not scaling linearly with the width. This leads to an increase of coupling capacitance with neighboring wires, leading to higher crosstalk. It also leads to poor performance due to poor RC response at the receiving of the wire, which may even result in failure in very noisy environments. An adaptive threshold scheme is proposed in which receiver switching thresholds are adjusted according to the detected noise in bus lines. These noise levels are dependent on both the front-end processing (transistor performance) as well as on the backend processing (metal resistance, capacitance, width and spacing). The circuit therefore automatically compensates for process variations.

16 Claims, 6 Drawing Sheets

OPERATING LONG ON-CHIP BUSES

The present invention relates to operating long on-chip buses.

Integrating large system on chip (SOC) devices can be a great challenge as the environment on the chip becomes more and more noisy. At the same time as the technology shrinks, on-chip wires are becoming narrower and denser, and their RC time constants are increasing. This leads to worsening delay over long interconnect runs. Such delays call for techniques which will enable on-chip buses to run at highest possible speed allowed by the environment.

Typically, inverters or buffers are used as receivers at the receiving end of a bus. FIG. 1 of the accompanying drawings schematically illustrates a bus on an integrated circuit device, the bus including a series of bus lines 4 which are interconnecting wires between drivers 2 and receivers 6. Each bus line 4 connects a driver 2 to a corresponding receiver 6. Since the rise/fall times are typically excessively long (for example, see FIG. 2 of the accompanying drawings; "IN" refers to input to bus driver and "LINEOUT" refers to output at the end of a 10 mm long bus on Metal 2 CMOS12) at the receiving end, the speed of sensing transitions on the bus is very slow, if the switching threshold of the inverter/buffer receiver is at Vdd/2 (half the supply voltage).

It is proposed to change this threshold (lower/raise) for both the rising and falling edge transitions so as to achieve fast sensing as well as achieve robust signaling in noisy environment. Changing the thresholds may cause the receiver to sense glitches caused by crosstalk, which are highly undesirable. In the case of very noisy environment the threshold can be raised above Vdd/2. Thus there exists a possibility to vary threshold of the receiver in order to achieve robust signaling at the highest possible speed in that environment.

Schmitt triggers are often used for rejecting noise wherein hysteresis of the transfer characteristics is utilized to raise the threshold for rising transitions and vice-versa for falling transitions at its input. However, this only provides variation of threshold in one direction and cannot be calibrated. In the proposed scheme the threshold can be varied in both the directions (raise or lower from Vdd/2 point) to suit the conditions on the chip. Since the calibration is done on the chip it takes care of process variations on both the front-end processing as well as on the backend processing.

According to one aspect of the present invention, there is provided a bus system for an integrated circuit device, the bus comprising a plurality of bus lines (4) each of which connects a driver circuit (2) and a receiver circuit (6), characterized in that each receiver circuit comprises:
 a first detector (10) operably connected to receive a data signal from an associated bus line (4), and operable to detect a rising transition of the data signal with respect to a first threshold level, and to produce a first output signal upon detection of such a rising transition;
 a second detector (12) operably connected to receive the data signal, and operable to detect a falling transition of the data signal with respect to a second threshold level, and to produce a second output signal upon detection of such a transition; and
 output means operable to output the first or second output signal as a receiver output signal.

According to another aspect of the present invention, there is provided a method of operating a bus system for an integrated circuit device, the bus comprising a plurality of bus lines (4) each of which connects a driver circuit (2) and a receiver circuit (6), characterized in that the method comprises:
 receiving a data signal from a bus line (4);
 detecting a rising or falling transition of the data signal with respect to first and second threshold levels respectively;
 producing a first output signal upon detection of a rising transition, or producing a second output signal upon detection of a falling transition; and
 outputting the first or second output signal as a receiver output signal.

Figure 1:
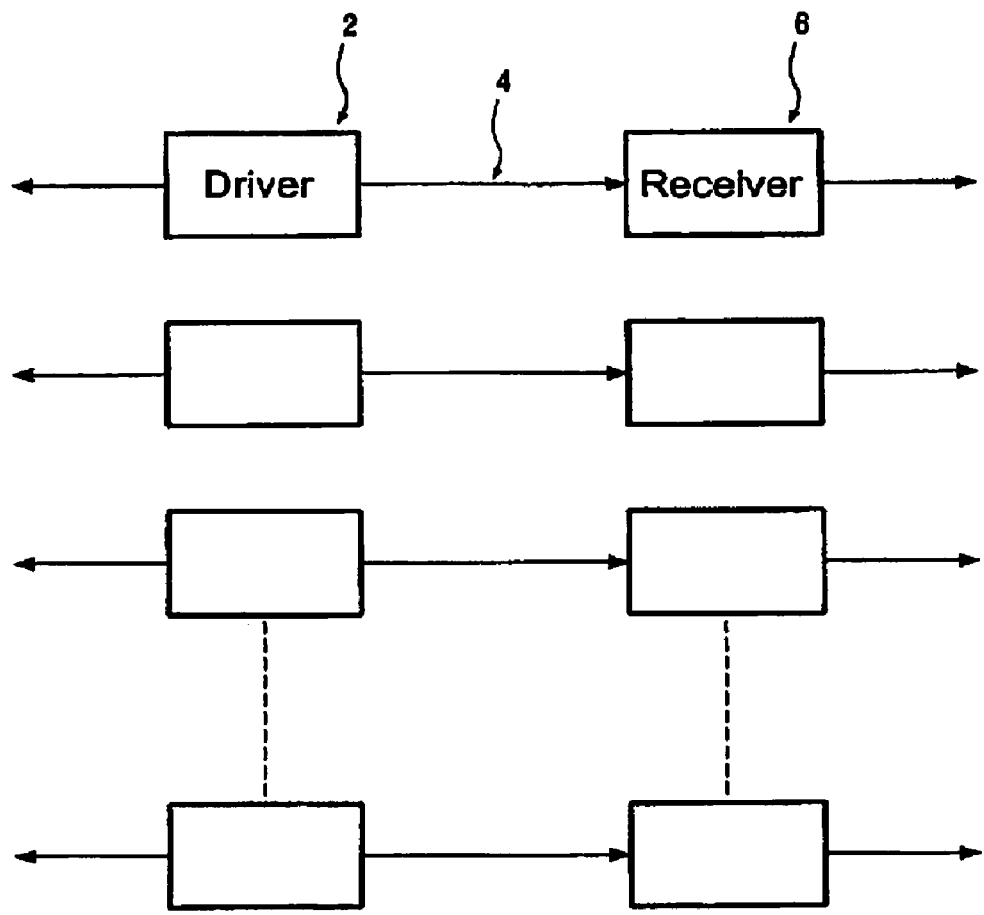
FIG. 1 illustrates schematically a bus on an integrated circuit device.
Figure 2:
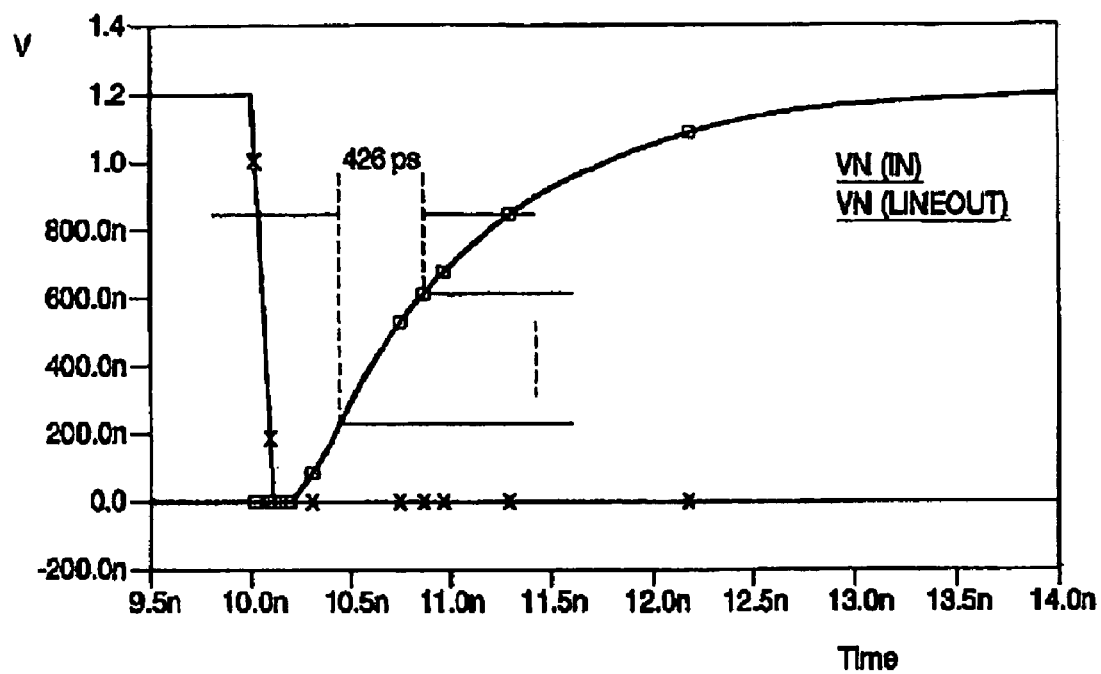
FIG. 2 illustrates RC response at the receiving end of a 10 mm wire on an M2, 0.13 µm CMOS circuit.
Figure 3:
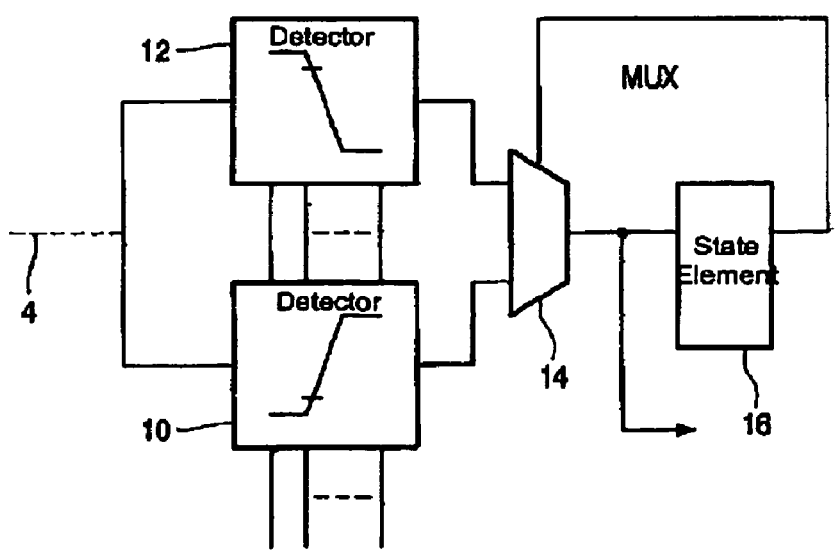
FIG. 3 illustrates a receiver circuit.

FIG. 3 illustrates a receiver circuit for use in embodiments of the present invention. The receiver of FIG. 3 has first and second detectors 10 and 12. The first detector 10 is sensitive to transitions occurring from low to high and the second detector from high to low. Both detectors are connected to receive the data signal transmitted on the bus wire 4, and are operable to detect respective transitions of that signal on the bus wire 4. The detectors have respective outputs which are combined via a multiplexer 14. The multiplexer 14 has a select line controlled by the previous data on the bus wire 4. The previous data value is stored in a state element 16. A state element could be a flip-flop, latch or a delay line.

The thresholds of the first and second detectors of the receiver are controlled by a control word, which is generated by a calibrator (not shown in FIG. 3).

Figure 4:
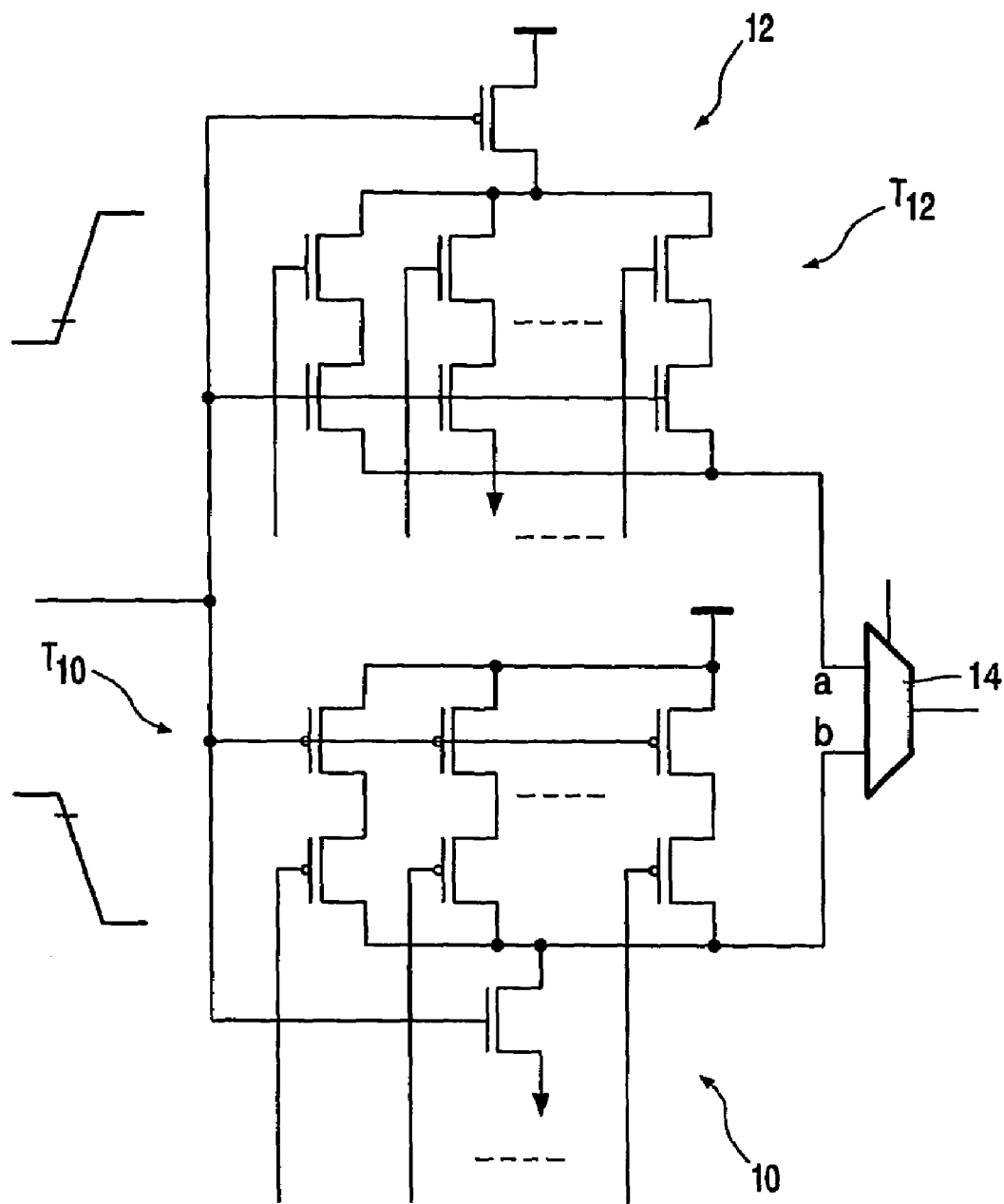
FIG. 4 illustrates the receiver circuit of FIG. 3 in more detail.

The receiver circuit is shown in more detail in FIG. 4. It consists of two inverters whose thresholds can be controlled independently by the calibrator. The calibrator applies the control word, which selects the number of transistors T10, T12 to be used in parallel in a respective pull down/up networks in the inverters of the receiver. This tunes the threshold of the inverters for rising and falling transitions respectively. The selection of signal to be output from the multiplexer is based on the previous value of the output, which is stored in the state element 16. For example, if the present value is high then the multiplexer 14 selects the output of the detector (inverter) 12 which is sensitive to falling transitions.

Figure 5:
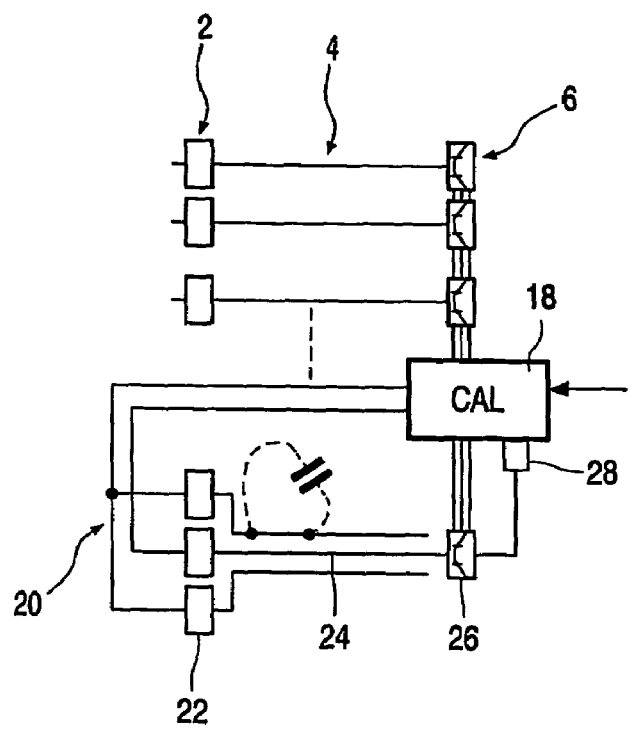
FIG. 5 illustrates a scheme with a dummy bus.
Figure 6:
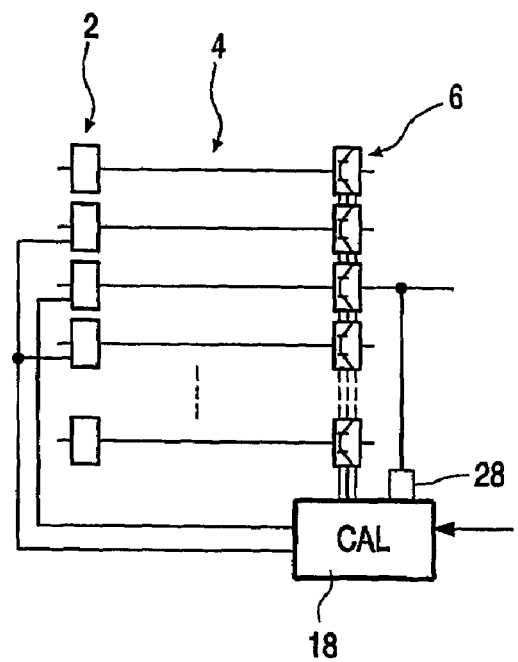
FIG. 6 illustrates a scheme which uses the same bus for calibration.

The calibrator 18 uses either a dummy bus as shown in FIG. 5, or the main bus with slight modifications in the driver circuit (which then uses a multiplexer) as shown in FIG. 6, to simulate worst case switching conditions on the chip. The simulation enables the calibrator to set the control word to an appropriate value. The calibration can be done once during power-up or during chip initialization. The dummy bus 20 technique shown in FIG. 5 involves the use of an extra set of bus drivers 22, bus lines 24, and bus receivers 26 to simulate the cross talk to be executed on the real bus 2,4,6.

The calibrator circuit is preferably implemented as a finite state machine (shown in FIG. 7), which applies signals on primary bus wires (aggressor wires) and measures the crosstalk on at least one secondary bus wire (victim wire). If a glitch is detected which can possibly cause failure then it changes the threshold of the receiver 10, 12 and re-applies the signals to the primary bus wires. This procedure is repeated until the output of the receiver circuit.

Figure 8:
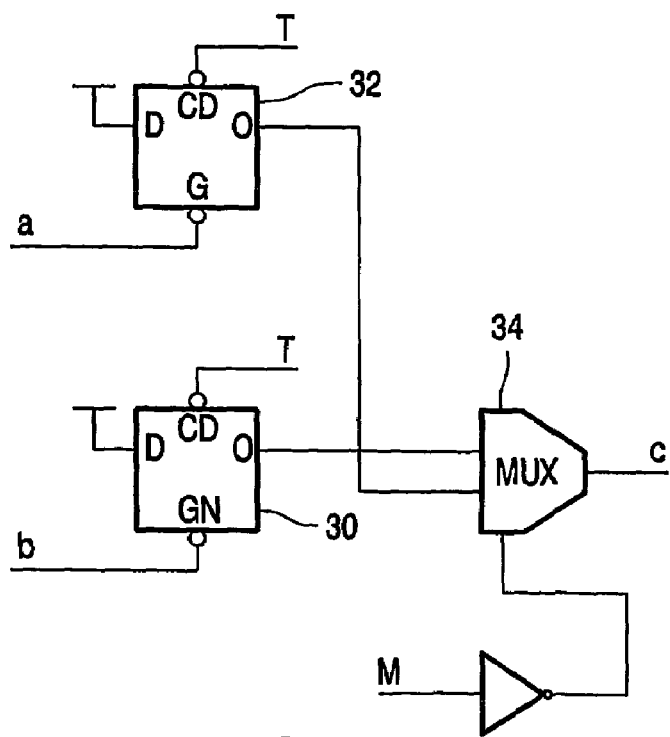
FIG. 8 illustrates glitch detection by using convention latches.

A glitch sensor circuit 28, which includes a pair of latches, is used to capture the glitches. See FIG. 8. The first latch 30, is transparent low and is connected to 'b' in FIG. 4. The other latch 32 is transparent high and is connected to 'a' in FIG. 4. Output from one of the latch is selected by a multiplexer 34 based on the logic level on the victim wire M which is generated by the calibrator 18.

Figure 7:
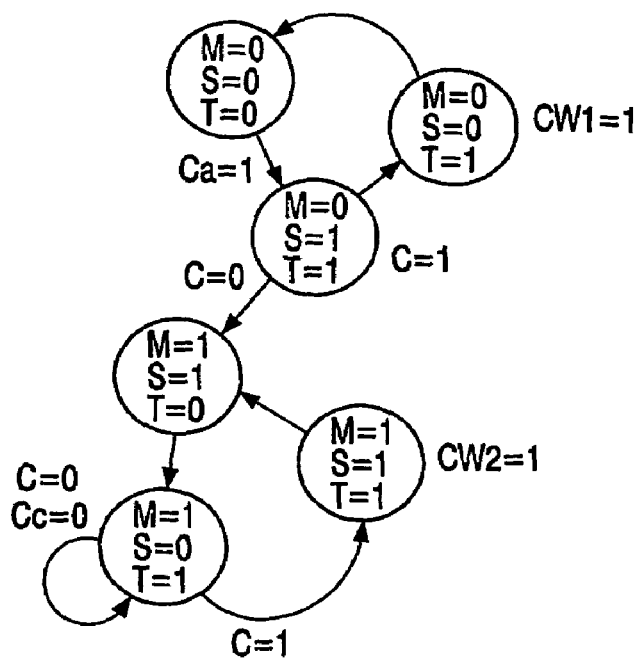
FIG. 7 illustrates a state diagram for the calibration circuit.

FIG. 7 illustrates the state diagram of the calibrator, 'M' and 'S' represent the signals on victim and aggressor wires respectively. Calibration starts when 'Ca' is asserted. 'T' is the reset signal to the glitch capturing latches. 'C' is a signal which goes high whenever the latches detect appreciable glitch at their inputs. 'CW1' and 'CW2' are the signals which are used to increment a counter in the calibrator 18 that generates the control word for the receiver circuit threshold adaptation.

Figure 9:
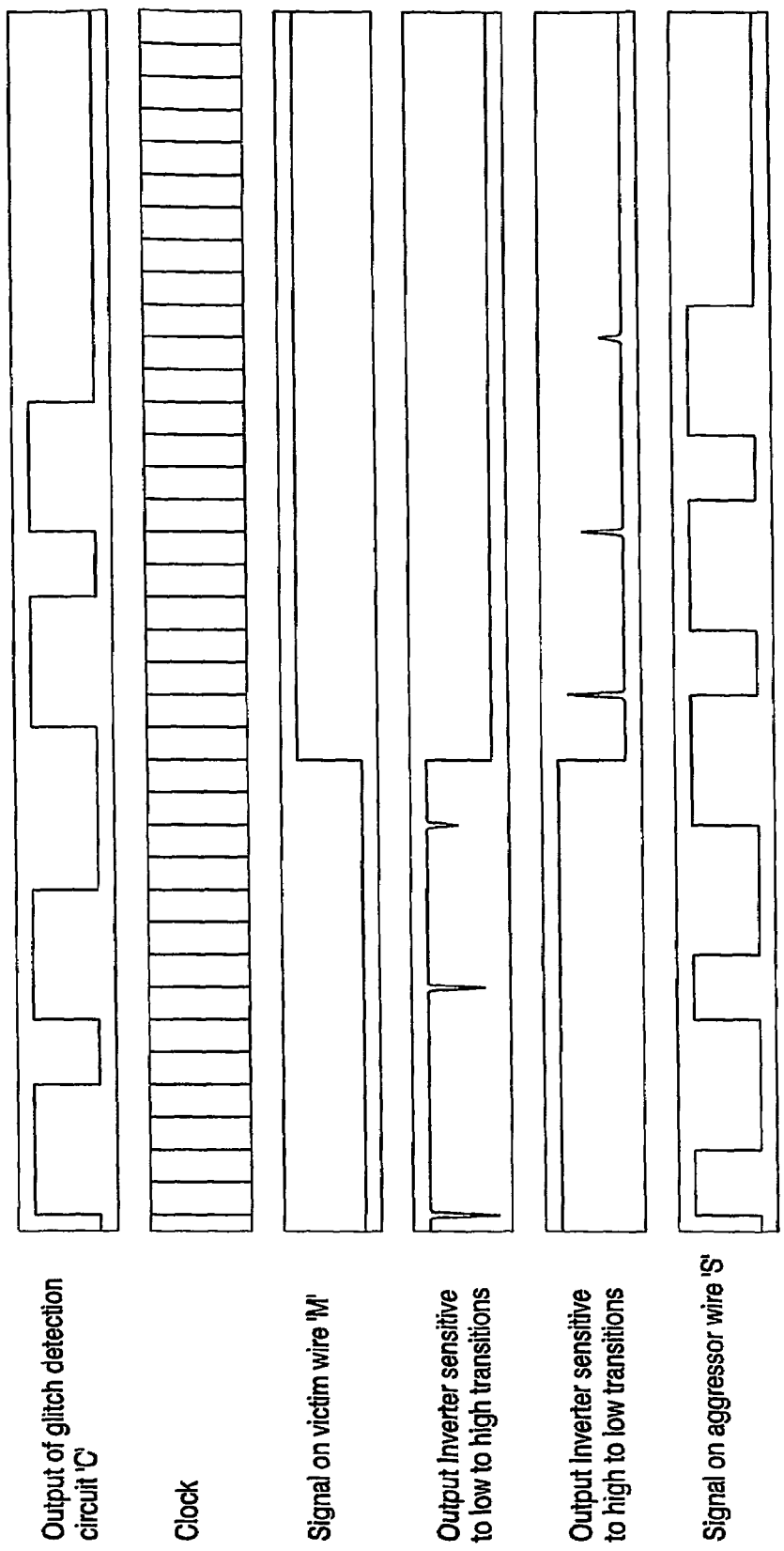
FIG. 9 illustrates some of the simulation waveforms.

As the calibration proceeds it can be seen with reference to FIG. 9 that the thresholds of the receiving inverters are adjusted so that the amplitude of glitches decrease.

The simulations are performed on a 10 mm long bus at minimum spacing and minimum width on Metal 2 in CMOS12 TSMC technology. In a typical process case, 10% performance gain can be achieved for the bus structure specified above. On the other hand in a very noisy environment which may occur due to process variations the threshold may be raised by the calibrator and hence avoid glitches at the output of receiver. In this case penalty will have to be paid in terms of increase in worst case delay along the bus. Glitch prevention may be very essential at the output of the receiver, especially in asynchronous circuits.

The invention claimed is:

1. A bus system for an integrated circuit device, the bus comprising a plurality of bus lines each of which connects a driver circuit and a receiver circuit; and a glitch sensor circuit which is operable to detect glitches on at least one of the bus lines, characterized in that each receiver circuit comprises:
a first detector operably connected to receive a data signal from an associated bus line, and operable to detect a rising transition of the data signal with respect to a first threshold level, and to produce a first output signal upon detection of such a rising transition;
a second detector operably connected to receive the data signal, and operable to detect a falling transition of the data signal with respect to a second threshold level, and to produce a second output signal upon detection of such a transition;
output means operable to output the first or second output signal as a receiver output signal; and
wherein the first and second threshold levels are variable.

2. A bus system as claimed in claim 1, wherein the output means comprises a multiplexer operably connected to receive the first and second output signals, and operable to output the receiver output signal in dependence upon a previous receiver output signal.

3. A bus system as claimed in claim 1, further comprising a calibrator for adjusting the first and second threshold levels.

4. A bus system as claimed in claim 3, wherein the first and second detectors include respective pluralities of transistors, and the calibrator is operable to activate varying numbers of those transistors, in order to adjust the threshold levels.

5. A bus system as claimed in claim 3, wherein the glitch sensor circuit comprises a pair of latches each having an output, and a multiplexer operable to select one of the latch outputs for supply to the calibrator.

6. A bus system as claimed in claim 3, wherein the calibrator is operable to supply test signals to the bus lines, and the glitch sensor circuit is operable to detect glitches on at least one bus line and to supply a glitch signal to the calibrator, the calibrator then being operable to adjust the threshold values of the detectors in dependence upon the glitch signal.

7. A bus system as claimed in claim 3, further comprising a test bus including a plurality of test drivers, and corresponding pluralities of bus lines and receivers, the calibrator being operable to supply test signals to the test bus lines, and the glitch sensor circuit being operable to detect glitches on the test bus lines and to supply a glitch signal to the calibrator, the calibrator then being operable to adjust the threshold values of the detectors in dependence upon the glitch signal.

8. A method of operating a bus system for an integrated circuit device, the bus comprising a plurality of bus lines each of which connects a driver circuit and a receiver circuit, characterized in that the method comprises:
receiving a data signal from a bus line;
detecting a rising or falling transition of the data signal with respect to first and second threshold levels respectively, wherein the first and second threshold levels are variable;
producing a first output signal upon detection of a rising transition, or producing a second output signal upon detection of a falling transition;
outputting the first or second output signal as a receiver output signal; and
detecting glitches on at least one of the bus lines.

9. A method as claimed in claim 8, wherein the first or second output signal is output by a multiplexer operably connected to receive the first and second output signals, and operable to output the receiver output signal in dependence upon a previous receiver output signal.

10. A method as claimed in claim 8, further comprising adjusting the first and second threshold levels.

11. A method as claimed in claim 10, wherein the rising transition is detected by a first detector and the falling transition is detected by a second detector, the first and second detectors include respective pluralities of transistors, and the threshold levels are adjusted by activating varying numbers of those transistors.

12. A method as claimed in claim 8, wherein the glitches are sensed using a glitch sensor circuit which comprises a pair of latches each having an output, and a multiplexer operable to select one of the latches.

13. A method as claimed in claim 8, further comprising supplying test signals to the bus lines, detecting glitches on at least one bus line, and adjusting the threshold values in dependence upon the detected glitches.

14. A method as claimed in claim 8, further comprising supplying test signals to test bus lines, detecting glitches on the test bus lines, and adjusting the threshold values in dependence upon the detected glitches.

15. A bus system as claimed in claim 1, wherein the glitches are signals on one of the bus lines caused by crosstalk from data signals on the other bus lines, the glitches causing transitions to be detected by at least one of the first and second detectors associated with the one of the bus lines.

16. A method as claimed in claim 8, wherein the glitches are signals on one of the bus lines caused by crosstalk from data signals on the other bus lines, the glitches causing transitions to be detected by at least one of the first and second detectors associated with the one of the bus lines.

* * * * *